(12) United States Patent
Baris et al.

(10) Patent No.: US 8,037,062 B2
(45) Date of Patent: Oct. 11, 2011

(54) SYSTEM AND METHOD FOR AUTOMATICALLY SELECTING A DATA SOURCE FOR PROVIDING DATA RELATED TO A QUERY

(75) Inventors: Russell Baris, Westport, CT (US); Ray Pan, Oxford, CT (US); Arthur Kruk, Stamford, CT (US)

(73) Assignee: Elumindata, Inc., Fairfield, CT (US)

( * ) Notice: Subject to any disclaimer, the term of this patent is extended or adjusted under 35 U.S.C. 154(b) by 533 days.

(21) Appl. No.: 12/257,230

(22) Filed: Oct. 23, 2008

(65) Prior Publication Data

US 2010/0023503 A1  Jan. 28, 2010

Related U.S. Application Data

(63) Continuation-in-part of application No. 12/177,742, filed on Jul. 22, 2008.

(51) Int. Cl.
*G06F 17/30* (2006.01)
(52) U.S. Cl. ........................... 707/723; 707/748
(58) Field of Classification Search ................ 707/723, 707/748
See application file for complete search history.

(56) References Cited

U.S. PATENT DOCUMENTS

| | | |
|---|---|---|
| 5,175,810 A | 12/1992 | Young et al. |
| 5,293,615 A | 3/1994 | Amada |
| 5,319,777 A | 6/1994 | Perez |
| 5,359,724 A | 10/1994 | Earle |
| 5,455,903 A | 10/1995 | Jolissaint et al. |
| 5,471,612 A | 11/1995 | Schlafly |
| 5,553,215 A | 9/1996 | Kaethler |
| 5,742,835 A | 4/1998 | Kaethler |
| 5,768,158 A | 6/1998 | Adler et al. |
| 5,890,174 A | 3/1999 | Khanna et al. |
| 5,893,123 A | 4/1999 | Tuinenga |
| 5,987,481 A | 11/1999 | Michelman et al. |
| 6,055,548 A | 4/2000 | Comer et al. |
| 6,061,681 A | 5/2000 | Collins |
| 6,134,563 A | 10/2000 | Clancey et al. |
| 6,138,130 A | 10/2000 | Adler et al. |
| 6,292,811 B1 | 9/2001 | Clancey et al. |

(Continued)

*Primary Examiner* — John E Breene
*Assistant Examiner* — Dennis Myint
(74) *Attorney, Agent, or Firm* — Amster, Rothstein & Ebenstein LLP (57) ABSTRACT

A computer-implemented method of prioritizing a predefined set of electronic data sources includes a step of identifying one or more second data sources corresponding to one or more first data sources if it is determined that the first data sources do not have the ability to provide data related to one or more query dimensions of a query statement. The identified one or more second data sources meet the following criteria: (1) one or more source fields of the one or more second data sources are equivalent to the one or more query dimensions not contained in the first data source; and (2) each source dimension field of the one or more second data sources are either: (A) equivalent to a source field of the first source or (B) have values that are capable of being obtained from the query statement. The one or more first data sources are linked with the corresponding one or more second data sources to generate one or more composite data sources. Scores are electronically assigned to each of the composite data sources based on certain criteria, and the composite data sources are electronically and dynamically ranked based on the assigned scores. One or more of the composite data sources electronically identified as having the highest rank are selected as preferred data sources for locating the data value in response to the query statement.

17 Claims, 4 Drawing Sheets

U.S. PATENT DOCUMENTS

| | | |
|---|---|---|
| 6,336,124 B1 | 1/2002 | Alam et al. |
| 6,430,584 B1 | 8/2002 | Comer et al. |
| 6,444,322 B1 | 9/2002 | Li et al. |
| 6,640,234 B1 | 10/2003 | Coffen et al. |
| 6,701,485 B1 | 3/2004 | Igra et al. |
| 6,754,677 B1 | 6/2004 | Cho et al. |
| 6,779,152 B1 | 8/2004 | Conner et al. |
| 6,782,403 B1 | 8/2004 | Kino et al. |
| 6,799,182 B2 | 9/2004 | Bata |
| 6,886,009 B2 | 4/2005 | Jeng et al. |
| 6,889,359 B1 | 5/2005 | Conner et al. |
| 6,904,428 B2 | 6/2005 | Frieder et al. |
| 6,915,308 B1 | 7/2005 | Evans et al. |
| 6,920,609 B1 | 7/2005 | Manber et al. |
| 6,986,099 B2 | 1/2006 | Todd |
| 6,988,241 B1 | 1/2006 | Guttman et al. |
| 7,010,779 B2 | 3/2006 | Rubin et al. |
| 7,012,112 B2 | 3/2006 | Takenaka et al. |
| 7,017,112 B2 | 3/2006 | Collie et al. |
| 7,082,969 B1 | 8/2006 | Hollerback |
| 7,249,316 B2 | 7/2007 | Collie et al. |
| 2001/0054034 A1 | 12/2001 | Arning et al. |
| 2002/0013786 A1 | 1/2002 | Machalek |
| 2002/0016801 A1 | 2/2002 | Reiley et al. |
| 2002/0026461 A1 | 2/2002 | Kutay et al. |
| 2002/0052893 A1 | 5/2002 | Grobler et al. |
| 2002/0055952 A1 | 5/2002 | Clancey et al. |
| 2002/0103825 A1 | 8/2002 | Bauchot |
| 2002/0129054 A1 | 9/2002 | Ferguson et al. |
| 2003/0217052 A1 | 11/2003 | Rubenczyk et al. |
| 2004/0023636 A1 | 2/2004 | Gurel |
| 2004/0044954 A1 | 3/2004 | Hosea |
| 2004/0060001 A1 | 3/2004 | Coffen et al. |
| 2004/0103366 A1 | 5/2004 | Peyton-Jones et al. |
| 2004/0103369 A1 | 5/2004 | Robertson et al. |
| 2004/0230571 A1 | 11/2004 | Robertson |
| 2005/0010861 A1 | 1/2005 | Augustyn et al. |
| 2005/0022111 A1 | 1/2005 | Collet et al. |
| 2005/0039114 A1 | 2/2005 | Naimat et al. |
| 2005/0071750 A1 | 3/2005 | Nelson |
| 2005/0097447 A1 | 5/2005 | Serra et al. |
| 2005/0097449 A1 | 5/2005 | Lumera et al. |
| 2005/0149482 A1 | 7/2005 | Dillon |
| 2005/0187952 A1 | 8/2005 | Werner |
| 2005/0188298 A1 | 8/2005 | Makela |
| 2005/0225202 A1 | 10/2005 | Vogeley et al. |
| 2005/0251733 A1 | 11/2005 | Elkady |
| 2005/0273697 A1 | 12/2005 | Weinberg et al. |
| 2005/0278307 A1 | 12/2005 | Battagin et al. |
| 2006/0015805 A1 | 1/2006 | Humenansky et al. |
| 2006/0036939 A1 | 2/2006 | Hobbs et al. |
| 2006/0048044 A1 | 3/2006 | Genesereth et al. |
| 2006/0075323 A1 | 4/2006 | Singh et al. |
| 2006/0075328 A1 | 4/2006 | Becker et al. |
| 2006/0080313 A1* | 4/2006 | Freire ................ 707/5 |
| 2006/0090129 A1 | 4/2006 | Collie et al. |
| 2006/0095833 A1 | 5/2006 | Orchard et al. |
| 2006/0101333 A1 | 5/2006 | Collie et al. |
| 2006/0184870 A1 | 8/2006 | Christen et al. |
| 2006/0184873 A1 | 8/2006 | Kamiya |
| 2007/0219956 A1 | 9/2007 | Milton |
| 2008/0010264 A1* | 1/2008 | Morton et al. ............ 707/4 |
| 2008/0016041 A1 | 1/2008 | Frost et al. |
| 2010/0250586 A1* | 9/2010 | Hall et al. ............ 707/769 |

* cited by examiner

SYSTEM AND METHOD FOR AUTOMATICALLY SELECTING A DATA SOURCE FOR PROVIDING DATA RELATED TO A QUERY

RELATED APPLICATIONS

This application is related to U.S. patent application Ser. No. 11/729,373, entitled SYSTEM AND METHOD FOR AUTOMATICALLY GENERATING INFORMATION WITHIN AN ELECTRONIC DOCUMENT, filed Mar. 28, 2007, and is a continuation-in-part of U.S. patent application Ser. No. 12/177,742, filed Jul. 22, 2008, the contents of which are incorporated herein by reference.

FIELD OF THE INVENTION

The present invention relates to systems and methods for automatically selecting a data source, and more specifically to ranking a plurality of data sources based on their ability to provide data related to a query.

BACKGROUND OF THE INVENTION

A number of data sources may be accessed to determine the appropriate data in response to a query. For example, in business applications, a company may maintain numerous databases that include various types of data related to sales, inventory, employees, budget, etc. Determining which data sources are appropriate for obtaining data in response to a query is a tedious and time-consuming process.

SUMMARY OF THE INVENTION

A computer-implemented method of prioritizing a predefined set of electronic data sources according to an exemplary embodiment of the present invention comprises the steps of: (a) providing a database stored on a computer readable medium, wherein the database contains metadata related to the predefined set of electronic data sources, and the metadata comprises, for each electronic data source, one or more source fields, each of the one or more source fields comprising a data item or a source dimension; (b) electronically receiving first signals at a processor, wherein the first signals relate to a query statement for a data value; (c) electronically identifying a query data item and one or more query dimensions based on the query statement; (d) electronically determining first data sources within the database in which at least one of the one or more source fields is equivalent to the query data item; (e) electronically assigning a score to each of the first data sources based on one or more criteria, wherein the one or more criteria comprise at least the ability to provide data related to the one or more query dimensions and the extent of aggregation necessary to provide the data; (f) determining whether any one of the first data sources has a score that indicates the first data source has the ability to provide the data related to the one or more query dimensions; (g) identifying one or more second data sources within the database corresponding to one or more of the first data sources if it is determined that the first data sources have scores that indicate the first data sources do not have the ability to provide data related to the one or more query dimensions, the one or more second data sources meeting the following criteria: (1) one or more source fields of the one or more second data sources are equivalent to the one or more query dimensions not contained in the first data source; and (2) each source dimension of the one or more second data sources are either: (A) equivalent to a source field of the first source or (B) have values that are capable of being obtained from the query statement; (h) linking the one or more first data sources with the corresponding one or more second data sources to generate one or more composite data sources; (i) electronically assigning a score to each of the composite data sources based on the one or more criteria; (j) electronically and dynamically ranking the composite data sources based on the assigned scores; and (k) electronically identifying one or more of the composite data sources having the highest rank as preferred data sources for locating the data value.

In at least one embodiment, the metadata further comprises information regarding whether a relationship exists between source dimensions of the data sources.

In at least one embodiment, the method further comprises the step of updating the database with information regarding whether the relationship between the source dimensions is a direct feed relationship or an indirect feed relationship if it is determined that a relationship exists between source dimensions of the data sources.

In at least one embodiment, the relationship is a classification relationship.

In at least one embodiment, the relationship is an aggregation relationship.

In at least one embodiment, the ability of the data source to provide data corresponding to the one or more query dimensions is determined based on whether one or more source dimensions of the data source are equivalent to the one or more query dimensions.

In at least one embodiment, the ability of the data source to provide data corresponding to the one or more query dimensions is determined based on one or more of the following: quality of data in the data source, quantity of data in the data source, and user selection of one or more preferred data sources.

In at least one embodiment, higher scores are assigned to data sources in which one or more source dimensions are the same as the one or more query dimensions as compared to scores assigned to data sources that do not have one or more source dimensions that are the same as the one or more query dimensions.

In at least one embodiment, the ability of the data source to provide data corresponding to the one or more query dimensions is determined based on whether the data source includes one or more source dimensions that are related to the one or more query dimensions.

In at least one embodiment, if the data source includes one or more source dimensions that are related to the one or more query dimensions, the data source is assigned a score that is higher than the scores assigned to the data sources that do not include one or more source dimensions that are related to the one or more query dimensions.

In at least one embodiment, if the data source includes one or more source dimensions that are in a direct feed relationship to the one or more query dimensions, the data source is assigned a score that is higher than the scores assigned to the data sources that include one or more source dimensions that are in an indirect feed relationship with the one or more query dimensions.

In at least one embodiment, the step of electronically determining first data sources comprises identifying data sources in which at least one or more source fields are synonyms of the query data item.

In at least one embodiment, the ability of the data source to provide data corresponding to the one or more query dimensions is determined based on whether one or more source dimensions of the data source are synonyms of the one or more query dimensions.

In at least one embodiment, the method further comprises applying the one or more data sources sequentially to locate the data value.

In at least one embodiment, the method further comprises applying the one or more data sources in parallel to locate the data value.

In at least one embodiment, the step of electronically determining first data sources comprises determining first data sources in which at least one or more source fields are the same as the query data item.

In at least one embodiment, the step of identifying one or more second data sources comprises identifying one or more second data sources comprising one or more source fields that are the same as the one or more query dimensions not contained in the first data source.

These and other features of this invention are described in, or are apparent from, the following detailed description of various exemplary embodiments of this invention.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

DETAILED DESCRIPTION OF THE PREFERRED EMBODIMENT(S)

Various exemplary embodiments of the present invention are directed to a method of prioritizing electronic data sources based on the data sources' ability to provide a data value in response to a query statement. Each query statement may include a data item and one or more dimensions. For purposes of the present invention, the term "data item" may refer to a variable for which a value is being sought. For example, in the query statement, "Price of an Acura RSX", the data item is "Price". The term "dimension" refers to a category (qualifier) of the data item. In the above example, "car manufacturer" and "car model" are the dimensions, and "Acura" and "RSX" are the dimension values for these dimensions, respectively.

In exemplary embodiments of the present invention, a database containing metadata relating to a set of data sources may be provided. The metadata may include, for each data source, a collection of fields that may include one or more source data items and optionally one or more source dimensions. For example, a data source may be a spreadsheet including information regarding price and horsepower of particular car models and makes, in which case the source data items would be "price" and "horsepower", and the source dimensions would be the car model and make. The metadata may also include additional information, such as information relating to whether source dimensions are related and if so, what types of relationships exist between the source dimensions. For example, one dimension may be in a direct feed relationship or an indirect feed relationship with another dimension. For the purposes of the present invention, a dimension is in a "direct feed relationship" with another dimension when that dimension can be directly aggregated to the other dimension. For example, a dimension value like "Mustang" may be part of a group like "Ford", and the child-parent relationship (e.g., Mustang is a kind of Ford) between these values indicates a "direct feed" relationship between their respective dimensions (car models can be aggregated to car manufacturer). Dimensions are in a "indirect feed relationship" when one dimension can be aggregated to another dimension only after being aggregated to one or more other dimensions. For example, edition (e.g., Mustang GT) is a direct feed of car model (e.g., Mustang) and an indirect feed of car manufacturer (e.g., Ford). The metadata may also include information related to the key fields of the data sources.

In an exemplary embodiment of the present invention, prioritization of the data sources may be performed by first identifying those data sources that contain a source field that is equivalent to the data item identified in the query. Those data sources are then assigned a score based on the whether the data sources include the required dimensions. It is also determined whether a particular data source includes dimensions that are in a direct feed relationship or an indirect feed relationship with other dimensions.

In an exemplary embodiment, a higher score is given to those data sources that include the required data item and dimensions. Also, a higher score is given to data sources that include dimensions that are in a direct relationship to the required dimension as compared to data sources having dimensions that are in an indirect relationship to the required dimension. Data sources not containing both the required query data items and source dimensions that are equivalent to or aggregate to all query dimensions may be given a score of zero, indicating that such data sources are not capable of providing the necessary information in response to the query statement. Also, data sources that have additional source dimensions not needed for the query data may be assigned a lower score. It should be appreciated that the present invention is not limited to this scoring scheme, and any other scoring method may be used that takes into account the above factors. For example, lower scores may be assigned to data sources having the required data item and data dimensions.

The data sources are then prioritized based on their assigned scores. In an embodiment, the data sources having the highest scores are preferred for identifying the required data value in response to the query. In an embodiment of the invention, data sources having scores of zero would not be considered.

The data source may further be prioritized based on other factors, such as, for example, quality of data in the data sources, quantity of data in the data sources, and user selection of one or more preferred data sources.

According to another aspect of the invention, the system may be capable of recognizing synonyms so as to determine whether a particular source data item matches a query data item or whether a particular source dimension matches or is related to a query dimension.

Figure 1:
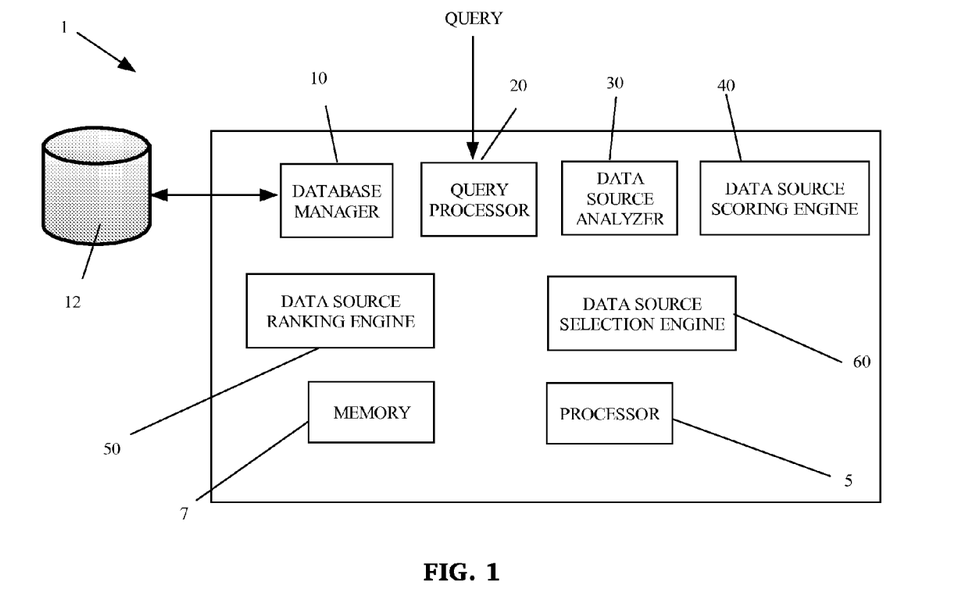
FIG. 1 is a block diagram of a system for automatically selecting a data source for providing data related to a query according to an exemplary embodiment of the present invention.

FIG. 1 is a block diagram of a system, generally designated by reference number 1, for automatically selecting a data source for providing data related to a query according to an exemplary embodiment of the present invention. The system 1 includes a processor 5, a memory 7, a database manager 10, a database 12, a query processor 20, a data source analyzer 30, a data source scoring engine 40, a data source ranking engine 50, and a data source selection engine 60. Various components of the system 1 may generate instructions that are executable on the processor 5. In this regard, the various components may be made up of computer software components, computer hardware components, or a combination of software and hardware components.

The database manager 10 stores metadata relating to a predefined set of electronic data sources in the database 12. The database 12 may be a virtual database, a conventional database or a combination of conventional and virtual databases. The database 12 may be located remote from the other components of the system 1, such as, for example, in remote communication over an Internet connection, WAN or LAN, or integrated within the system 1. The metadata relating to the data sources may include, for each data source, at least one data item and at least one dimension. The metadata may also include a list of relationships between dimensions. For example, there may be classification relationships (e.g., the dimension value "April-2008" is a sub-class of the dimension "month"; the dimension value "Google" is a sub-class of the dimension "company"; the dimension value "Camry" is a sub-class of the dimension "car model") and hierarchy relationships (e.g., the dimension values "April-2008", "May-2008" and "June-2008" aggregate to the dimension value "2Q08"; the dimension values "MDX", "RDX", "RL", "TL" and "TSX" aggregate to the dimension value "Acura") between dimensions. Further, a dimension may be a direct or indirect feed into other dimensions. In this regard, in combining the metadata into a dimension/data feed list, the system 1 may automatically build a list of all dimensions appearing in any of the data sources, assign a one or more character code for each dimension, build a list of which dimensions may feed directly into other dimensions by identifying which dimension values aggregate into values of other dimensions, and build a list of which dimensions can feed indirectly into other dimensions by applying multiple feeds. For time dimensions, a dimension/data feed table may be provided automatically with, for example, "Day", "Week", "Month", "Quarter", "HalfYear", "Year", where each dimension feeds those of longer duration.

The query processor 20 receives and analyzes a query to determine a query data item and a query dimension. Preferably, the query processor 20 is capable of recognizing dimensions and data items, otherwise known as data descriptors, within a query. In this regard, a rule-based algorithm may be used to determine the data descriptors. For example, such an algorithm may use rules based on the relative location or the format of the entered query, or such rules may predefine a specific data entry as a data item or a dimension. As a further example, in the case in which the query is in the form of a spreadsheet having blank fields, the query processor 20 may recognize the row and column headers as data descriptors. It should be appreciated that the present invention is not limited to the use of a rule-based algorithm for the determination of data descriptors. For example, the query processor 20 may use natural language processing, or the query processor 20 may communicate with a user to determine the context in which an ambiguous term is used (e.g., the term "Ford", which may refer to the automobile manufacturer, the brand of automobile or the person). In this regard, the query processor 20 may communicate with the user by, for example, a dialog box, instant message or e-mail.

The data source analyzer 30 determines which of the data sources includes a source field that is equivalent to the query data item. In this regard, the data source analyzer 30 may compare the query data item recognized by the query processor 20 with the source fields in each of the data sources.

The data source scoring engine 40 assigns a score to the data sources based on a number of factors, including the ability to provide data at the query dimensions and the extent of aggregation necessary to provide the data at the query dimensions. In an exemplary embodiment of the present invention, the data source scoring engine 40 assigns a score of "0" to any data source that does not contain the required data item and that data source is eliminated. For each query dimension and for each data source, if the data source has a dimension that directly matches the query dimension, a predetermined number X of points is added to that data source's score (e.g, X=10,000). If the data source has a dimension that is in a direct feed relationship with the query dimension, a predetermined number Y of points is added to that data source's score, where Y<X (e.g., Y=100). If the data source has a dimension that is in an indirect feed relationship with the query dimension, a predetermined number Z of points is added to that data source's score, where Z<Y<X (e.g., Z=1). If the data source does not include a dimension that matches or is related to the query dimension, that data source is assigned a score of "0". If all data sources are assigned scores of "0", it may be determined by a separate algorithm that two or more data sources appropriately joined together may function as a single data source that would qualify for a non-zero score. In an exemplary embodiment, if a data source has additional dimensions not used for the query, that data source's score may be divided by some amount (e.g., 10) for each such dimension.

The data source scoring engine 40 may take other factors into consideration besides the ability of the data sources to provide data at the query dimensions and the extent of aggregation necessary to provide the data at the query dimensions. For example, quality of data, quantity of data and user selection of preferred data sources may also be considered.

The data source ranking engine 50 ranks the data sources based on their scores assigned by the data source scoring engine 40. The data source with the highest non-zero score is the preferred data source, and may be queried first. The remaining data sources are preferably ranked in descending order by score as backup sources for the query. If multiple data sources are assigned scores greater than zero, a computer implemented algorithm may be used to search those data sources for data values that satisfy the query. These searches may be done either sequentially, starting with the highest rated source and continuing until either the query is satisfied or all data sources are exhausted, or in parallel, with query requests sent to all qualifying sources at the same time.

Figure 2:
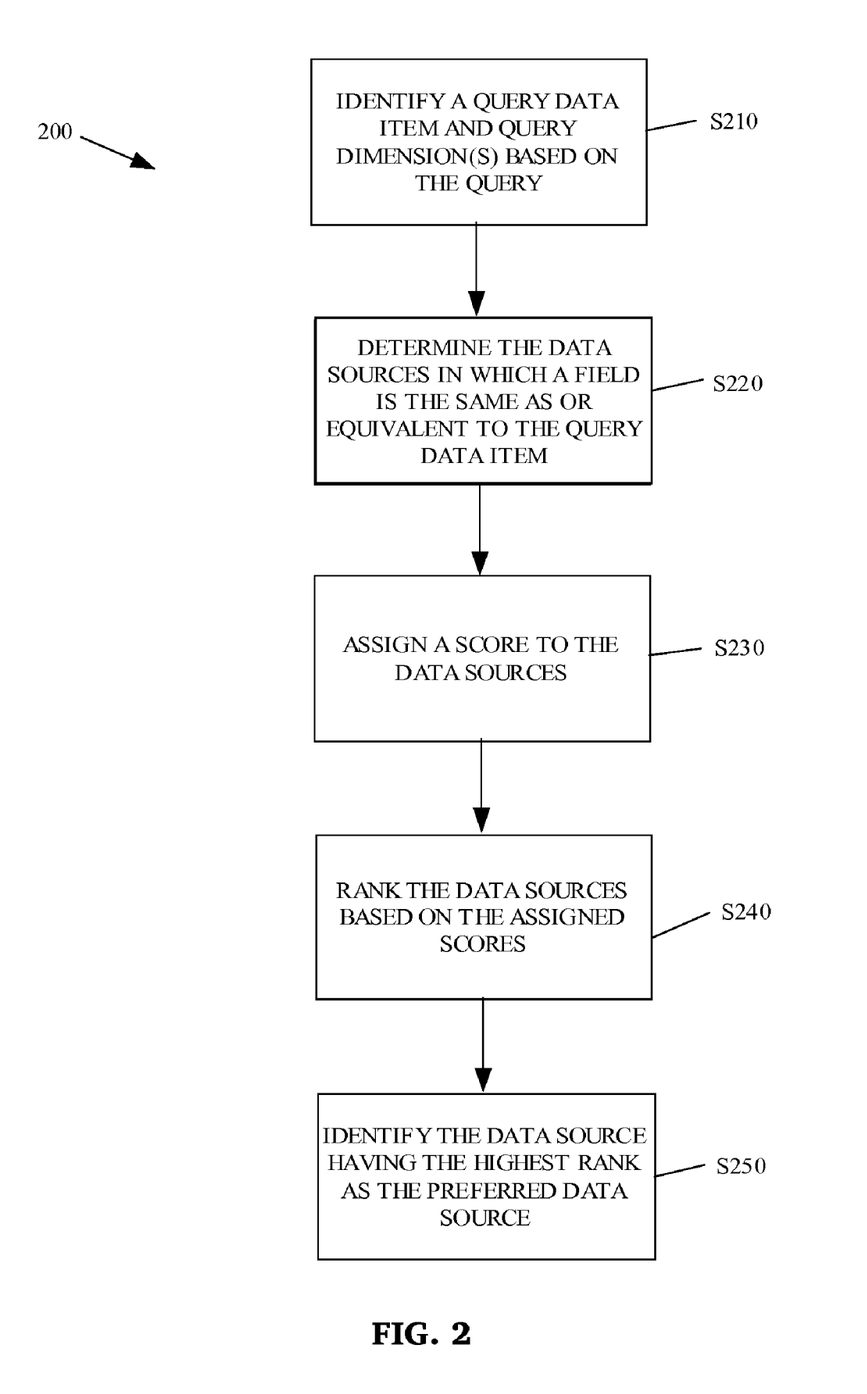
FIG. 2 is a flowchart showing a method for automatically selecting a data source for providing data related to a query according to an exemplary embodiment of the present invention.

FIG. 2 is a flowchart showing a method, generally designated by reference number 200, for automatically selecting a data source for providing data related to a query according to an exemplary embodiment of the present invention. In step S210, the query processor 20 determines a query data item and one or more query dimensions based on the query. As explained above, the data descriptors related to the query may be determined using, for example, a rule-based algorithm.

In step S220, the data source analyzer 30 determines which of the data sources have source fields that are equivalent to the query data item. Any data sources that do not include the query data item are eliminated as potential data sources for the query.

In step S230, the data source scoring engine 40 assigns a score to the data sources based on a number of factors, including, for example, the data source's ability to provide data at the one or more query dimensions and the extent of aggregation necessary to provide the data value at the query dimension. In this regard, a higher score may be given to those data sources that include the query dimension, and a lower score may be assigned to those data sources that include dimensions that are related to the query dimensions. A lower score may be assigned to those data sources that include dimensions that are in an indirect relationship to the query dimension as compared to the score assigned to data sources having dimensions that are in a direct relationship with the query dimension. Scoring may also be based on, for example, quality of the data in the data source, quantity of data in the data source, and user selection of one or more preferred data sources.

In step S240, the data source ranking engine 50 ranks the data sources based on the their assigned scores, with the highest scored data source preferably ranked first. In step S250, the data source selection engine 60 selects highest scored data source as the preferred data source for providing the data in response to the query. The remaining data sources are made available as back-up data sources in case the preferred data source is unable to provide the necessary data.

The following example demonstrates a selection of a data source based on a query according to an exemplary embodiment of the invention:

EXAMPLE 1

The following query is input by a user:

| Data Item: | Sales |
|---|---|
| Dimensions/Values: | Model = Camry |
| | Month = April-08 |

The data source database includes the following metadata related to a number of available data sources (Tables 1-6):

| Table# | Term | Data Item | Dimension |
|---|---|---|---|
| 1 | Sales | Yes | No |
| | Month | No | Yes |
| | Model | No | Yes |
| 2 | Sales | Yes | No |
| | Corp | No | Yes |
| | Year | No | Yes |
| | HQ State | No | Yes |
| 3 | Sales | Yes | No |
| | Region | No | Yes |
| | Company | No | Yes |
| | Day | No | Yes |
| 4 | Sales | Yes | No |
| | Dealer | No | Yes |
| | Edition | No | Yes |
| | Model | No | Yes |
| | Year | No | Yes |
| 5 | Sales | Yes | No |
| | Deliveries | Yes | No |
| | Dealer | No | Yes |
| | Model | No | Yes |
| | Week | No | Yes |
| 6 | Deliveries | Yes | No |
| | State | No | Yes |
| | Model | No | Yes |
| | Quarter | No | Yes |

The data source database also includes the following lists of classification and aggregation relationships:

| Classification Relationships: | |
|---|---|
| Entity | Is A Sub-Class Of |
| Camry | Model |
| Accord | Model |
| Toyota | Company |
| Lincoln | Company |
| Ford Motor | Corp |
| General Motors | Corp |

| Aggregation Relationships: | |
|---|---|
| Entity | Aggregates To |
| Camry | Toyota |
| Odyssey | Honda |
| Accord | Honda |
| Town Car | Lincoln |
| Lincoln | Ford Motor |
| Chevrolet | General Motors |

The database manager generates the following dimension/data feed list using all dimensions included in the data sources, with feeds implied from the hierarchy relationships:

| Code | Dimension | Direct Feeds | Indirect Feeds |
|---|---|---|---|
| A | Model | F | |
| B | Company | AE | F |
| C | HQ State | BH | AEF |
| D | Region | G | |
| E | Dealer | | |
| F | Edition | | |
| G | State | | |
| H | Corp | B | AEF |
| 1 | Day | | |
| 2 | Week | 1 | |
| 3 | Month | 12 | |
| 4 | Quarter | 123 | |
| 5 | Year | 1234 | |

Using the metadata stored in the system database, the data source analyzer and data source scoring engine is able to generate the following list of scored data sources:

| Table # | Score |
|---|---|
| 1 | 20000 |
| 2 | 0 |
| 3 | 0 |
| 4 | 0 |
| 5 | 1010 |
| 6 | 0 |

The scoring is determined as follows:

1. Tables 1-5 all contain the query data item (Sales). Table 6 does not, so it is eliminated as a potential data source for the query.

2. Tables 2 and 4 are ineligible because their time dimension (Year) is more aggregated than the required query time dimension (Month).
3. Table 3 does not contain the query dimension (Model). It does contain Region and Company, but neither of these dimensions can be aggregated to the dimension Model.
4. Table 1 is the preferred source, since it has the highest score (20,000). Table 1 contains both query dimensions, Month and Model, as source dimensions.
5. Table 5 is the only eligible backup source. Table 5 does contain the query data item (Sales) and query dimension (Model). It also has a dimension (Week) that is a direct feed to query dimension (Month). In addition, it has one dimension (Dealer) that is not used for the query.

Figure 3:
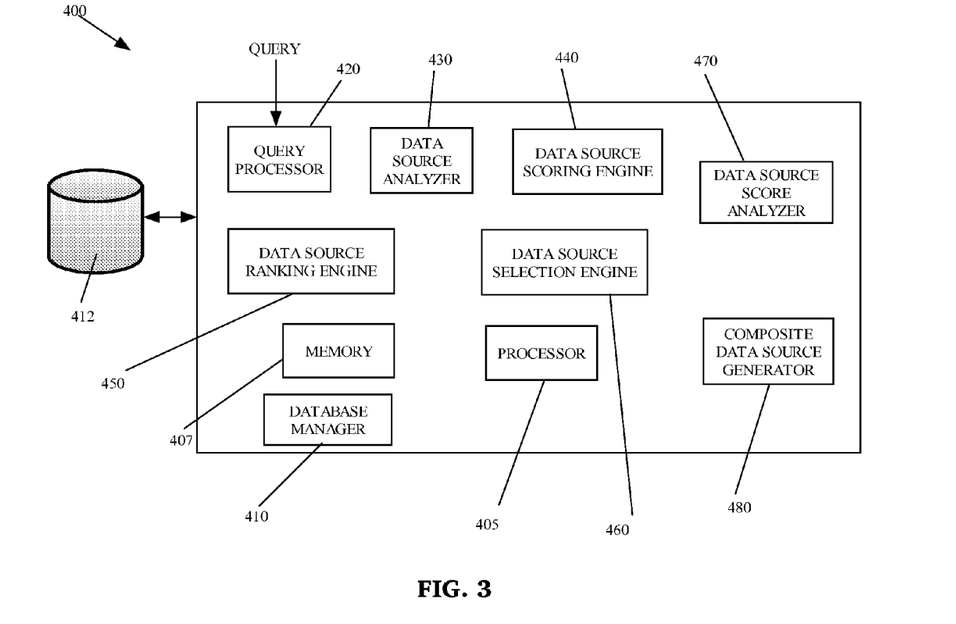
FIG. 3 is a block diagram of a system for automatically selecting a data source for providing data related to a query according to an exemplary embodiment of the present invention.

FIG. 3 is a block diagram of a system, generally designated by reference number 400, for automatically selecting a data source for providing data related to a query according to an exemplary embodiment of the present invention. As in the previous embodiment, the system 400 includes a processor 405, a memory 407, a database manager 410, a database 412, a query processor 420, a data source analyzer 430, a data source scoring engine 440, a data source ranking engine 450, and a data source selection engine 460. As explained in further detail below, the system 400 according to the present exemplary embodiment further includes a data source score analyzer 470 and a composite data source generator 480. Various components of the system 1 may generate instructions that are executable on the processor 5. In this regard, the various components may be made up of computer software components, computer hardware components, or a combination of software and hardware components.

The data source score analyzer 470 determines whether any one of the data sources scored by the data source scoring engine 440 has a score that indicates the data source has the ability to provide data related to the query dimensions. For example, in the case in which any score higher than zero indicates an appropriate data source, the data source score analyzer 470 may determine whether any of the data sources have a non-zero score. Situations in which no data sources may be appropriate to provide the required data may occur when, for example, there are no existing data sources in which source dimensions of the data source are the same as the query dimensions, there are no existing data sources in which source dimensions of the data source are equivalent (e.g., synonyms) to the query dimensions, or there are no existing data sources in which source dimensions of the data source are in a direct or indirect feed relationship to the query dimensions.

The composite data source generator 480 automatically identifies and links appropriate data sources to provide data related to the query if the data source score analyzer 470 determines that none of the data sources on their own are capable of providing the data. In this regard, the composite data source generator 480 may identify second data sources based on specific criteria that indicates the second data sources are capable of being linked with the first data sources to provide the appropriate data. For each of the first data sources, the criteria used to determine the second data sources may be:

CRITERIA 1: at least one of the source fields of the second data sources must be equivalent to a query dimension not contained in the first data source; and
CRITERIA 2: each source dimension of the second data sources must either:
  CRITERIA 2A: be equivalent to a field in the first data source; or
  CRITERIA 2B: have a value that is capable of being obtained from the query statement.

The following examples illustrate the functions of the composite data source generator 480:

EXAMPLE 2

A user inputs a query statement for the number of basketball players in the NBA who attended a particular college (UCLA or Georgia Tech) and for the number of points the players scored.

The data source database includes Table A, which is a table of data having a single source dimension field, "Player", and several data item fields, including "Height", "Birthdate" and "College", and Table B, which is a table of data having two source dimension fields, "Player" and "Team", and several data item fields, including "Games Played", "Points", "Rebounds" and "Assists". Since the field "Points" is included in Table B, Table B may be used to satisfy the query for the number of points scored by the players. However, Table B does not include the field "College". Table A does include the field "College" and thus Table A satisfies Criteria 1. In this case, the one source dimension field of Table A, "Player", is a field of Table B, so Table A satisfies criteria 2A. Thus, Tables A and B taken together are identified as a valid data source where "College" is effectively treated as an additional field of Table B.

EXAMPLE 3

A user inputs a query statement for what colleges were attended by any basketball players who played for the Lakers. The same two data sources from Example 2 are made available.

Since the query data item "College" only appears in Table A, only Table A is identified as a potential data source for providing the required data. However, Table A does not include the query dimension "Team". Table B does include the query dimension "Team", and thus Table B satisfies Criteria 1 and is identified as a potential data source for linking with Table A to obtain the required data. The source dimension field "Player" in Table B is equivalent to the field "Player" in Table A, satisfying criteria 2A. Also, the source dimension field "Team" of Table B is set to "Lakers" in the query statement, so that the source dimension field "Team" satisfies Criteria 2B. Thus, Tables A and B taken together are identified as a valid data source.

The data source scoring engine 440, the data source ranking engine 450, and the data source selection engine 460 function as in the previous embodiment to score, rank and select composite data sources that are able to provide the required data.

Figure 4:
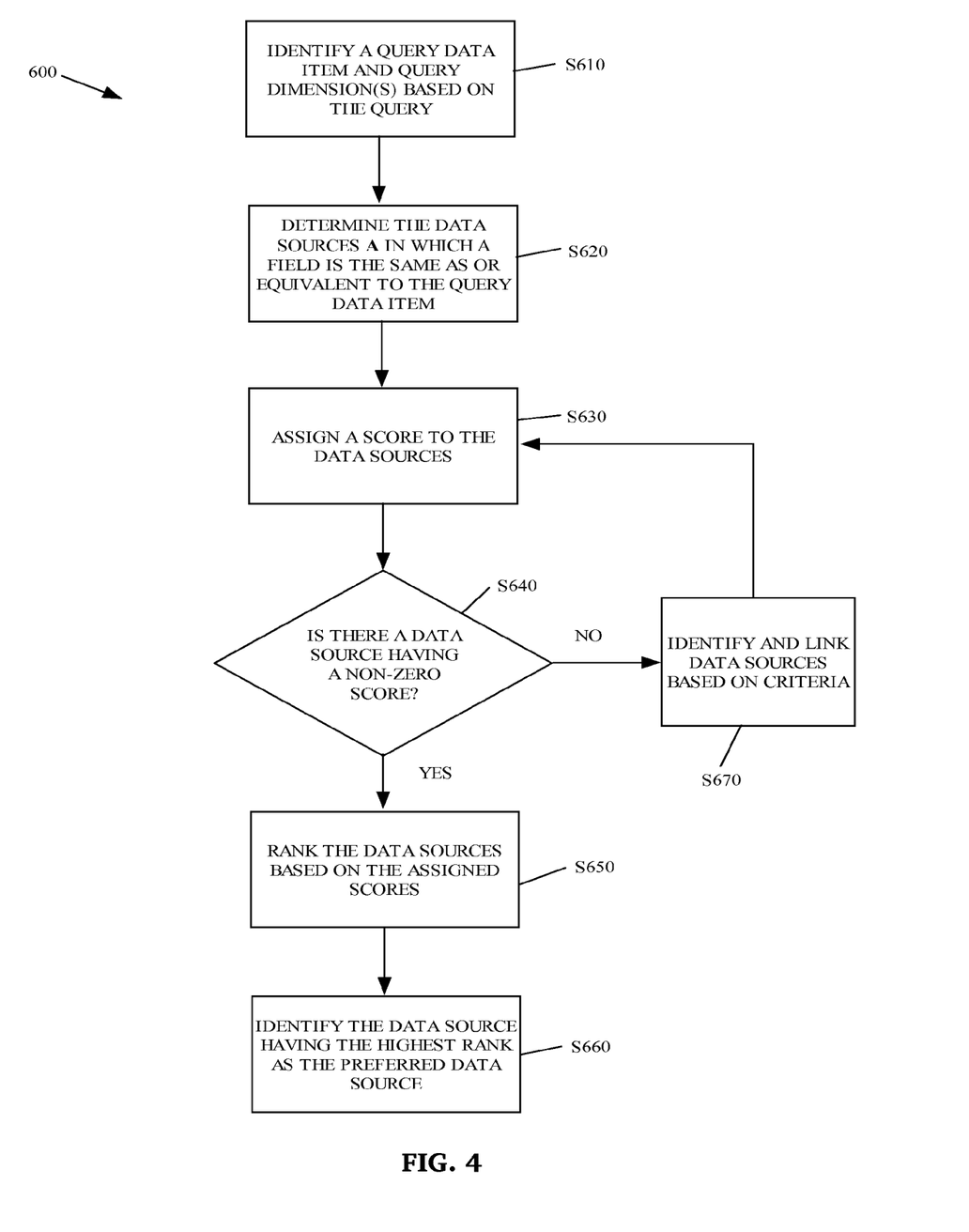
FIG. 4 is a flowchart showing a method for automatically selecting a data source for providing data related to a query according to an exemplary embodiment of the present invention.

FIG. 4 is a flowchart showing a method, generally designated by reference number 600, for automatically selecting a data source for providing data related to a query according to an exemplary embodiment of the present invention. In step S610, the query processor 420 determines a query data item and one or more query dimensions based on the query. As explained above, the data descriptors related to the query may be determined using, for example, a rule-based algorithm.

In step S620, the data source analyzer 430 determine which of the data sources have source fields that are equivalent to the query data item. Any data sources that do not include source fields that are equivalent to the query data item are eliminated as potential data sources for the query.

In step S630, the data source scoring engine 440 assigns a score to the data sources based on a number of factors, including, for example, the data source's ability to provide data at the one or more query dimensions and the extent of aggregation necessary to provide the data value at the query dimension. In this regard, a higher score may be given to those data sources that include the query dimension, and a lower score may be assigned to those data sources that include dimensions that are related to the query dimensions. A lower score may be assigned to those data sources that include dimensions that are in an indirect relationship to the query dimension as compared to the score assigned to data sources having dimensions that are in a direct relationship with the query dimension. Scoring may also be based on, for example, quality of the data in the data source, quantity of data in the data source, and user selection of one or more preferred data sources.

In step S640, the data source score analyzer 470 determines whether any one of the data sources scored by the data source scoring engine 440 has a score that indicates the data source has the ability to provide data related to the query dimensions. For example, in the case in which any score higher than zero indicates an appropriate data source, the data source score analyzer 470 may determine whether any of the data sources have a non-zero score.

If it is determined in step S640 that there are data sources with an approved score, process continues on as in the previous embodiment to step S650, where the data source ranking engine 450 ranks the data sources based on the their assigned scores, with the highest scored data source preferably ranked first. In step S660, the data source selection engine 460 selects the highest scored data source as the preferred data source for providing the data in response to the query.

If it is determined in step S640 that there are no data sources with an approved score, process flows to step S670, where the composite data source generator 480 automatically identifies and links appropriate data sources to provide data related to the query. As discussed above, the composite data source generator 480 may identify second data sources based on Criteria 1 and Criteria 2A or Criteria 2B that indicates the second data sources are capable of being linked with the first data sources to provide the appropriate data.

From step S640, the process then jumps back to step S630, where the data source scoring engine 440 assigns a score to the generated composite data sources. The process then continues through steps S640-S660 to select the highest scored composite data source as the preferred data source for providing the data in response to the query.

Now that the preferred embodiments of the present invention have been shown and described in detail, various modifications and improvements thereon will become readily apparent to those skilled in the art. The present embodiments are therefore to be considered in all respects as illustrative and not restrictive, the scope of the invention being indicated by the appended claims, and all changes that come within the meaning and range of equivalency of the claims are therefore intended to be embraced therein.

What is claimed is:

1. A computer-implemented method of prioritizing a predefined set of electronic data sources, the method comprising the steps of:
    (a) providing a database stored on a computer readable medium, wherein the database contains metadata related to the predefined set of electronic data sources, and the metadata comprises, for each electronic data source, one or more source fields, each of the source fields comprising a data item or a source dimension;
    (b) electronically receiving first signals at a processor that is operatively connected to the computer readable medium, wherein the first signals relate to a query statement for a data value;
    (c) electronically identifying a query data item and one or more query dimensions based on the query statement;
    (d) electronically determining first data sources within the database in which at least one of the one or more source fields is equivalent to the query data item;
    (e) electronically assigning a score to each of the first data sources based on one or more criteria, wherein the one or more criteria comprise an ability to provide data related to the one or more query dimensions and an extent of aggregation necessary to provide the data;
    (f) determining whether any one of the first data sources has a score that indicates the first data source has the ability to provide the data related to the one or more query dimensions;
    (g) identifying one or more second data sources within the database corresponding to one or more of the first data sources if it is determined that the first data sources have scores that indicate the first data sources do not have the ability to provide data related to the one or more query dimensions, the one or more second data sources meeting the following criteria:
        (1) one or more source fields of the one or more second data sources are equivalent to the one or more query dimensions not contained in the first data source; and
        (2) each source dimension of the one or more second data sources are either: (A) equivalent to a source field of the first source or (B) have values that are capable of being obtained from the query statement;
    (h) linking the one or more first data sources with the corresponding one or more second data sources to generate one or more composite data sources;
    (i) electronically assigning a score to each of the composite data sources based on the one or more criteria;
    (j) electronically and dynamically ranking the composite data sources based on the assigned scores; and
    (k) electronically identifying one or more of the composite data sources having the highest rank as preferred data sources for locating the data value.

2. The method of claim 1, wherein the metadata further comprises information regarding whether a relationship exists between source dimensions of the data sources.

3. The method of claim 2, further comprising the step of updating the database with information regarding whether the relationship between the source dimensions is a direct feed relationship or an indirect feed relationship if it is determined that a relationship exists between one or more source dimensions of the data sources.

4. The method of claim 3, wherein the ability of the data source to provide data corresponding to the one or more query dimensions is determined based on whether the data source includes one or more source dimensions that are related to the one or more query dimensions.

5. The method of claim 4, wherein, if the data source includes one or more source dimensions that are related to the one or more query dimensions, the data source is assigned a score that is higher than the scores assigned to the data sources that do not include one or more source dimensions that are related to the one or more query dimensions.

6. The method of claim 4, wherein, if the data source includes one or more source dimensions that are in a direct feed relationship to the one or more query dimensions, the data source is assigned a score that is higher than the scores assigned to the data sources that include one or more source dimensions that are in an indirect feed relationship with the one or more query dimensions.

7. The method of claim 2, wherein the relationship is a classification relationship.

8. The method of claim 2, wherein the relationship is an aggregation relationship.

9. The method of claim 1, wherein the ability of the data source to provide data corresponding to the one or more query dimensions is determined based on whether one or more source dimensions of the data source are equivalent to the one or more query dimensions.

10. The method of claim 9, wherein higher scores are assigned to data sources in which one or more source dimensions are the same as the one or more query dimensions as compared to scores assigned to data sources that do not have one or more source dimensions that are the same as the one or more query dimensions.

11. The method of claim 1, wherein the ability of the data source to provide data corresponding to the one or more query dimensions is determined based on one or more of the following: quality of data in the data source, quantity of data in the data source, and user selection of one or more preferred data sources.

12. The method of claim 1, wherein the step of electronically determining first data sources comprises determining data sources in which at least one or more source fields are synonyms of the query data item.

13. The method of claim 1, wherein the ability of the data source to provide data corresponding to the one or more query dimensions is determined based on whether one or more source dimensions of the data source are synonyms of the one or more query dimensions.

14. The method of claim 1, further comprising applying the one or more data sources sequentially to locate the data value.

15. The method of claim 1, further comprising applying the one or more data sources in parallel to locate the data value.

16. The method of claim 1, wherein the step of electronically determining first data sources comprises electronically determining first data sources in which at least one or more source fields are the same as the query data item.

17. The method of claim 1, wherein the step of identifying one or more second data sources comprises identifying one or more second data sources comprising one or more source fields that are the same as the one or more query dimensions not contained in the first data source.

* * * * *